(12) United States Patent
Soshi

(10) Patent No.: US 11,534,857 B2
(45) Date of Patent: Dec. 27, 2022

(54) COMPOSITE MEMBER AND METHOD FOR MANUFACTURING COMPOSITE MEMBER

(71) Applicants: ADVANCED RESEARCH FOR MANUFACTURING SYSTEMS, LLC, Woodland, CA (US); DMG MORI CO., LTD., Yamatokoriyama (JP)

(72) Inventor: Masakazu Soshi, Woodland, CA (US)

(73) Assignees: ADVANCED RESEARCH FOR MANUFACTURING SYSTEMS, LLC, Woodland, CA (US); DMG MORI CO., LTD., Yamatokoriyama (JP)

(*) Notice: Subject to any disclaimer, the term of this patent is extended or adjusted under 35 U.S.C. 154(b) by 548 days.

(21) Appl. No.: 15/315,566

(22) PCT Filed: Jul. 9, 2015

(86) PCT No.: PCT/JP2015/069795
§ 371 (c)(1),
(2) Date: Dec. 1, 2016

(87) PCT Pub. No.: WO2016/063584
PCT Pub. Date: Apr. 28, 2016

(65) Prior Publication Data
US 2017/0209958 A1    Jul. 27, 2017

(30) Foreign Application Priority Data

Oct. 21, 2014 (JP) .............................. JP2014-214685

(51) Int. Cl.
*B23K 26/00* (2014.01)
*B23K 26/342* (2014.01)
(Continued)

(52) U.S. Cl.
CPC ............ *B23K 26/0093* (2013.01); *B22F 3/24* (2013.01); *B22F 5/106* (2013.01); *B22F 7/06* (2013.01);
(Continued)

(58) Field of Classification Search
CPC ........... B22F 2003/247; B22F 2301/00; B22F 3/105; B22F 12/41; B22F 5/106;
(Continued)

(56) References Cited

U.S. PATENT DOCUMENTS 5,207,371 A * 5/1993 Prinz ...................... B23P 23/04
                                                        228/125
5,775,402 A    7/1998 Sachs et al.
(Continued)

FOREIGN PATENT DOCUMENTS

JP         61-183430 A    8/1986
JP         H01-502890 A   10/1989
(Continued)

OTHER PUBLICATIONS

Japanese to English machine translation of JP 2010-223013.*
(Continued)

*Primary Examiner* — John J Norton
*Assistant Examiner* — Simpson A Chen
(74) *Attorney, Agent, or Firm* — Oblon, McClelland, Maier & Neustadt, L.L.P.

(57) ABSTRACT

A composite member is manufactured by a manufacturing method including adding, on a surface of a base member composed of a first material, a second material different from the first material, using additive manufacturing employing directed energy deposition as an additive manufacturing process. The manufacturing method is performed by placing the base member in a machining area of a machine tool configured to perform subtractive machining.

(Continued)

Accordingly, a composite member can be obtained that is manufactured through additive manufacturing and that is in a state in which the composite member can be promptly machined.

8 Claims, 10 Drawing Sheets

(51) Int. Cl.

| | |
|---|---|
| *B23K 26/60* | (2014.01) |
| *B23K 26/08* | (2014.01) |
| *B23K 26/144* | (2014.01) |
| *B23K 26/14* | (2014.01) |
| *B23K 26/34* | (2014.01) |
| *B22F 5/10* | (2006.01) |
| *B22F 7/08* | (2006.01) |
| *B22F 3/24* | (2006.01) |
| *B22F 3/16* | (2006.01) |
| *B22F 7/06* | (2006.01) |
| *B23P 23/04* | (2006.01) |
| *B22F 10/20* | (2021.01) |
| *B23K 15/00* | (2006.01) |
| *B33Y 70/00* | (2020.01) |
| *B33Y 30/00* | (2015.01) |
| *B33Y 10/00* | (2015.01) |
| *B33Y 80/00* | (2015.01) |
| *B23Q 1/00* | (2006.01) |
| *B23K 101/06* | (2006.01) |
| *B23K 26/21* | (2014.01) |
| *B23Q 3/155* | (2006.01) |
| *B23Q 11/08* | (2006.01) |

(52) U.S. Cl.
CPC .............. *B22F 7/08* (2013.01); *B22F 10/20* (2021.01); *B23K 15/0033* (2013.01); *B23K 15/0086* (2013.01); *B23K 26/0823* (2013.01); *B23K 26/144* (2015.10); *B23K 26/1476* (2013.01); *B23K 26/21* (2015.10); *B23K 26/34* (2013.01); *B23K 26/342* (2015.10); *B23K 26/60* (2015.10); *B23P 23/04* (2013.01); *B33Y 10/00* (2014.12); *B33Y 30/00* (2014.12); *B33Y 70/00* (2014.12); *B33Y 80/00* (2014.12); *B22F 2003/247* (2013.01); *B22F 2301/00* (2013.01); *B23K 2101/06* (2018.08); *B23Q 1/0045* (2013.01); *Y02P 10/25* (2015.11)

(58) Field of Classification Search
CPC .......... B22F 7/08; B33Y 10/00; B23K 9/048; B23K 9/046; B23K 9/044; B23K 15/0086; B23K 26/342; B23K 26/0093; B23K 26/144

USPC ........................................................ 219/76.1
See application file for complete search history.

(56) References Cited

U.S. PATENT DOCUMENTS

| | | | |
|---|---|---|---|
| 6,463,349 B2 | 10/2002 | White et al. | |
| 7,073,561 B1* | 7/2006 | Henn | .................... B33Y 10/00 |
| | | | 164/94 |
| 9,186,726 B2* | 11/2015 | Keane | ...................... B32B 5/16 |
| 2002/0147521 A1* | 10/2002 | Mok | ..................... B29C 64/118 |
| | | | 700/159 |
| 2005/0112230 A1 | 5/2005 | Herzog | |
| 2010/0047470 A1 | 2/2010 | Abe et al. | |
| 2011/0227590 A1* | 9/2011 | Killian | ................ F15B 15/2861 |
| | | | 427/314 |
| 2014/0061167 A1* | 3/2014 | Stecker | ................. B22F 3/1055 |
| | | | 219/76.1 |
| 2014/0124483 A1* | 5/2014 | Henn | .................... B23K 26/342 |
| | | | 219/76.1 |
| 2014/0147328 A1 | 5/2014 | Abe et al. | |

FOREIGN PATENT DOCUMENTS

| | | | | |
|---|---|---|---|---|
| JP | H 05271898 A * | 10/1993 | ............... | C23C 4/12 |
| JP | H 0680163 B2 * | 10/1994 | .......... | B29C 48/509 |
| JP | 10-337618 A | 12/1998 | | |
| JP | 2000-073108 A | 3/2000 | | |
| JP | 2004-277881 A | 10/2004 | | |
| JP | 2010-47817 A | 3/2010 | | |
| JP | 2010-201430 A | 9/2010 | | |
| JP | 2010-223013 | 10/2010 | | |
| WO | WO 2014/160695 A1 | 10/2014 | | |

OTHER PUBLICATIONS

Japanese to English machine translation of JP 2010-201430.*
Young Modulus of Elasticity for Metals and Alloys, Sep. 28, 2013, The Engineering ToolBox (Year: 2013).*
Thermal Conductivity of Metals, Oct. 31, 2013, The Engineering ToolBox (Year: 2013).*
International Search Report dated Sep. 29, 2015, in PCT/JP2015/069795 filed Jul. 9, 2015.
Japan Patent Office, "Patent application technical trends surveys (Fiscal 2013): 3D printer", [online], (Mar. 2014), [Accessed on Sep. 19, 2014], Internet, URL: http://www.jpo.go.jp/shiryou/pdf/gidouhoukoku/25_3dprinter.pdf.
Extended European Search Report dated Jun. 1, 2018 in Patent Application No. 15853007.1.
Alexander Pieler, et al., "Multitalent Hybridmaschine spart Bearbeitungskosten", Maschinemarkt Das Industriemagazin, vol. 2014, No. 15, XP009505432, Apr. 2014, 7 pages.
David Locke, et al., "Laser metal deposition defined", Industrial Laser Solutions, Nov. 2010, 9 pages.

* cited by examiner

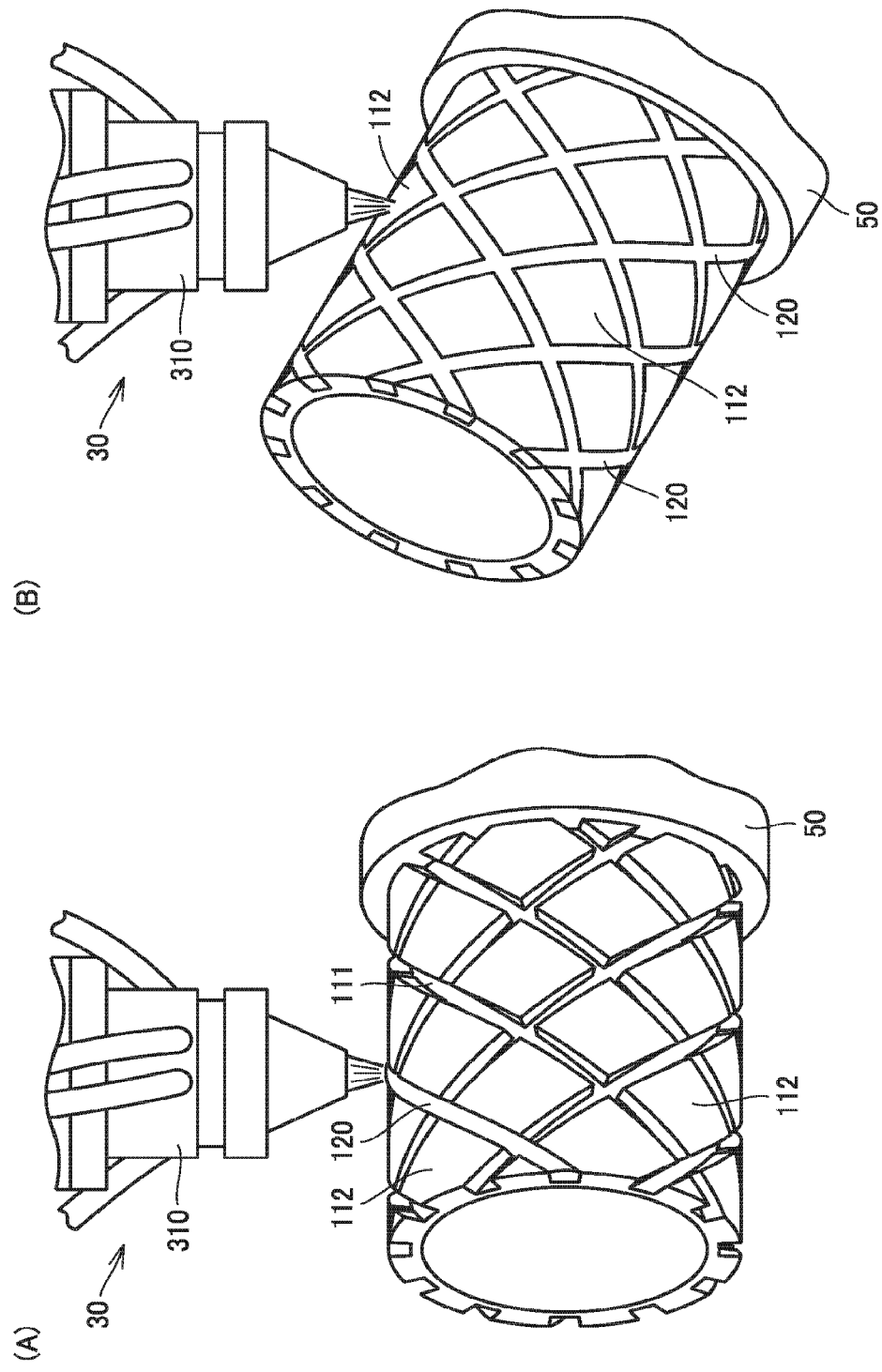

COMPOSITE MEMBER AND METHOD FOR MANUFACTURING COMPOSITE MEMBER

TECHNICAL FIELD

The present invention relates to a composite member configured to include different metals and a method for manufacturing the composite member.

BACKGROUND ART

Conventionally, it has been known to manufacture a composite member through cladding using a metal.

Japanese Patent Laying-Open No. 10-337618 (PTD 1) discloses a machining apparatus configured to machine a composite member obtained by such cladding. Specifically, PTD 1 discloses that a cladding portion formed by melting and cladding copper alloy powders on a valve seat portion in a cylinder head composed of an aluminum-based casting alloy is machined into a predetermined shape by the machining apparatus.

Moreover, as one exemplary method for manufacturing a composite member, Japanese Patent Laying-Open No. 61-183430 (PTD 2) discloses a method for manufacturing a screw for injection molding machines. Specifically, PTD 2 discloses a method for manufacturing a screw for injection molding machines, including the steps of: filling a groove of a steel shaft with an alloy material powder mixture including tungsten carbide powders; and sintering the alloy material powder mixture by heating the shaft thus filled with the alloy material powder mixture at a high temperature under a pressure.

Moreover, additive manufacturing has been known conventionally. Additive manufacturing refers to a process of creating an object based on a numerical representation of a three-dimensional shape by adding a material as also described in NPD 1 described below. In many cases, additive manufacturing is implemented by stacking a layer on another layer, and is contrast to subtractive manufacturing. It should be noted that the definition of such additive manufacturing is provided in ASTM F2792-12a (Standard Terminology for Additive Manufacturing Technologies) of ASTM International, which is a private, standards development organization for industrial standards. In addition, additive manufacturing is also referred to as "3D printer".

CITATION LIST

Patent Document

PTD 1: Japanese Patent Laying-Open No. 10-337618
PTD 2: Japanese Patent Laying-Open No. 61-183430

Non Patent Document

NPD 1: Japan Patent Office, "Patent application technical trends surveys (Fiscal 2013): 3D printer", [online], March, 2014, [Accessed on Sep. 19, 2014], Internet (URL: http://www.jpo.go.jp/shiryou/pdf/gidou-houkoku/25_3dprinter.pdf)

SUMMARY OF INVENTION

Technical Problem

The cladding in PTD 1 is just a technique of adding, on a surface of an underlying member (i.e., substrate), a material having a property different from the substrate, and does not have a process of creating an object based on a numerical representation of a three-dimensional shape. Hence, the cladding in PTD 1 does not employ additive manufacturing.

Moreover, the machining apparatus of PTD 1, which serves as a machine tool configured to perform subtractive machining, is an apparatus for machining the composite member obtained through the cladding, and does not have a function to perform cladding. Hence, the cladding is performed by an apparatus other than the machining apparatus. Accordingly, in order to machine a composite member obtained through cladding, the user has to move the composite member and place the composite member in a predetermined position within the machining apparatus.

In the manufacturing method of PTD 2, the composite member is obtained through sintering rather than additive manufacturing, and therefore has the following disadvantage. That is, the groove is likely to be insufficiently filled with the alloy material powder mixture at its angled portion (corner portion), with the result that air bubbles are highly likely to be formed in the connected portion. This leads to decreased connection strength and decreased thermal conductivity at the connected portion, disadvantageously.

The invention of the present application has been made in view of the above problem, and has an object to obtain a composite member that is manufactured through additive manufacturing and that is in a state in which the composite member can be promptly machined.

Solution to Problem

A composite member according to the present invention is manufactured by a manufacturing method including the step of adding, on a surface of a first member composed of a first material, a second material different from the first material, using additive manufacturing employing directed energy deposition as an additive manufacturing process. The manufacturing method is performed by placing the first member in a machining area of a machine tool configured to perform subtractive machining.

Preferably, the manufacturing method further includes the step of removing a portion of a second member composed of the added second material.

Preferably, the manufacturing method further includes the step of manufacturing a third member using the additive manufacturing to cover the second member after the removing.

Preferably, the manufacturing method further includes the step of manufacturing the first member by cutting a workpiece using the machine tool.

Preferably, in the step of adding the second material, the second material is added to a cut portion of the workpiece.

Preferably, the manufacturing method further includes the step of manufacturing the first member by the additive manufacturing.

Preferably, the directed energy deposition employs laser or electron beam. The machine tool is capable of changing a posture of the first member placed in the machining area. The manufacturing method controls the posture of the first member such that an angle of application of the laser or the electron beam with respect to a first area in the surface of the first member becomes a first angle in the first area. The manufacturing method controls the posture of the first member such that an angle of application of the laser or the electron beam with respect to a second area in the surface of the first member becomes a second angle in the second area.

Preferably, the second material has a thermal conductivity higher than a thermal conductivity of the first material.

Preferably, the second material has a strength stronger than a strength of the first material.

According to another aspect of the present invention, a method for manufacturing a composite member includes the step of adding, on a surface of a member composed of a first material, a second material different from the first material, using additive manufacturing employing directed energy deposition as an additive manufacturing process. The step is performed by placing the first member in a machining area of a machine tool configured to perform subtractive machining.

Advantageous Effects of Invention

According to the present invention, a composite member can be promptly obtained that is manufactured through additive manufacturing and that is in a state in which the composite member can be promptly machined.

BRIEF DESCRIPTION OF DRAWINGS

FIG. 14 illustrates a configuration in which a direction of applying metal powders upon performing additive manufacturing is changed for each area to which the metal powders are applied.

DESCRIPTION OF EMBODIMENTS

Figure 1:
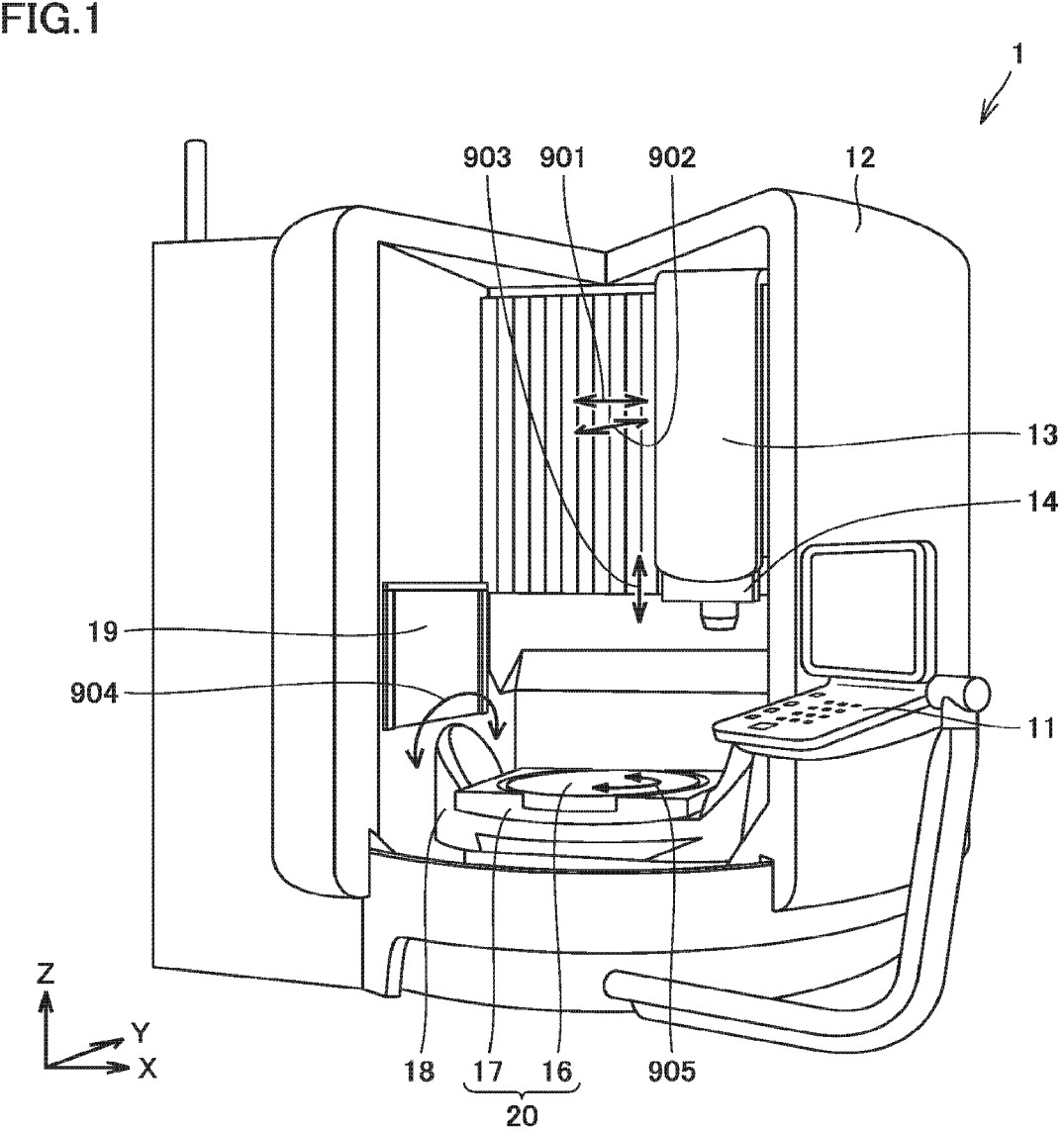
FIG. 1 is a schematic diagram for illustrating external appearance and internal structure of a machine tool 1 for manufacturing a composite member.

With reference to figures, the following describes a composite member and a machine tool configured to manufacture the composite member according to an embodiment of the present invention. In the description below, the same reference characters are given to the same parts. Their names and functions are also the same. Hence, they are not described in detail repeatedly.

Moreover, in the description below, a 5-axis machine having a function of additive manufacturing (i.e., 3D printer) will be illustrated as one example of the above-described machine tool. However, the machine tool is not limited to the 5-axis machine. The machine tool may be any subtractive machine (for example, 4-axis machine) having the function of additive manufacturing. Furthermore, in the description below, it is assumed that directed energy deposition is used as an additive manufacturing process in additive manufacturing.

<A. Overview of Machine Tool>

FIG. 1 is a schematic diagram for illustrating external appearance and internal structure of a machine tool 1 for manufacturing a composite member. With reference to FIG. 1, machine tool 1 includes an operating system 11, a splash guard 12, a spindle head 13, a spindle 14, a rotation apparatus 18, a door 19, and a table apparatus 20.

Table apparatus 20 has a rotation table 16 and a mount 17 configured to rotatably support rotation table 16. Table apparatus 20 is attached to rotation apparatus 18. Specifically, mount 17 is fixed to the central portion of rotation apparatus 18.

Operating system 11 is a numerical control device serving as a conventional operating panel. Operating system 11 controls an overall operation of machine tool 1 by executing a program or the like designed by a user. For example, operating system 11 controls operations of spindle head 13, spindle 14, rotation apparatus 18, door 19, table apparatus 20, and an additive manufacturing apparatus 30 described later. It should be noted that operating system 11 is a well-known system and is therefore not described herein in detail.

Spindle head 13 is attached to a cross rail (not shown). Spindle head 13 is provided to slidably move in an axial direction represented by an arrow 901 (X-axis direction) and an axial direction represented by an arrow 902 (Y-axis direction). Spindle 14 is attached to spindle head 13.

Spindle 14 is provided to slidably move in an axial direction represented by an arrow 903 (Z-axis direction). Spindle 14 has a tip provided with a structure to which a tool holder having a tool attached thereon can be installed.

Examples of the tool holder include: additive manufacturing apparatus 30 (FIG. 2) configured to perform additive manufacturing; and a tool holder stored in a tool magazine (not shown) (for example, a tool holder 40 (FIG. 3) including an end mill). It should be noted that a tool holder other than additive manufacturing apparatus 30 is attached to spindle 14 by an automatic tool changer 21 (FIG. 3).

The tool magazine is disposed opposite to a machining area relative to door 19 (i.e., disposed behind door 19 in FIG. 1). It should be noted that the term "machining area" refers to a space (internal space of machine tool 1) which is partitioned by splash guard 12 and door 19 and in which spindle head 13, spindle 14, rotation apparatus 18, table apparatus 20, additive manufacturing apparatus 30, a workpiece, and the like are movably placed.

Each of spindle head 13 and spindle 14 is appropriately provided with a feed structure, a guidance structure, a servo motor, and the like to enable the slide movement thereof. In machine tool 1, respective slide movements of spindle head 13 and spindle 14 can be combined to freely change the position of the tool attached to the tool holder in the XYZ space.

Rotation apparatus 18 is provided to be rotatable through motor driving with respect to a center axis extending in the X-axis direction. Rotation of rotation apparatus 18 causes table apparatus 20 to rotate clockwisely and counterclockwisely (direction represented by an arrow 904) with respect to the center axis.

In a default state as shown in FIG. 1, rotation table 16 of table apparatus 20 is provided to be rotatable through motor driving with respect to the center axis extending in the vertical (Z-axis) direction. It should be noted that since rotation table 16 is rotated in the direction of arrow 904 by rotation apparatus 18, the center axis of rotation of rotation table 16 is changed while the center axis maintains to be in parallel with the YZ plane.

On rotation table 16, a workpiece is held using a chuck or various types of jigs. During cutting with a stationary tool, rotation table 16 is rotated to cause the workpiece to rotate clockwisely and counterclockwisely (direction of arrow 905) with respect to the center axis.

With the configuration described above, machine tool 1 is capable of changing a posture of a member, such as a workpiece, placed in the machining area.

Figure 2:
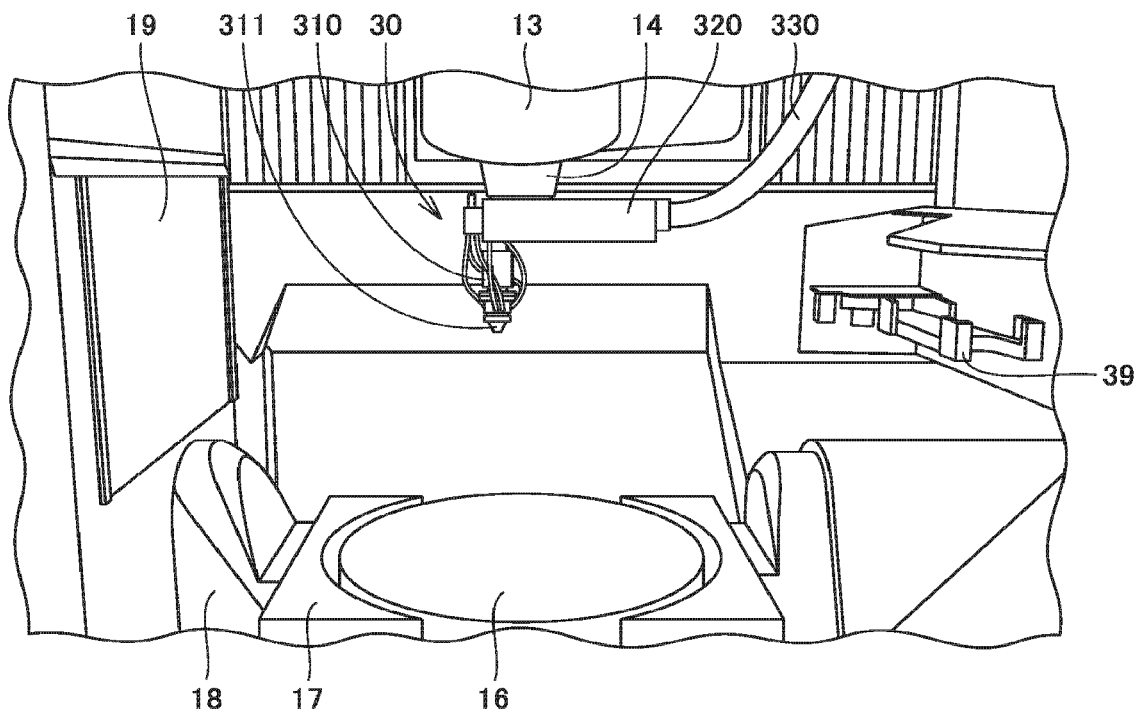
FIG. 2 shows a state in which an additive manufacturing apparatus 30 is attached to a spindle 14.
Figure 3:
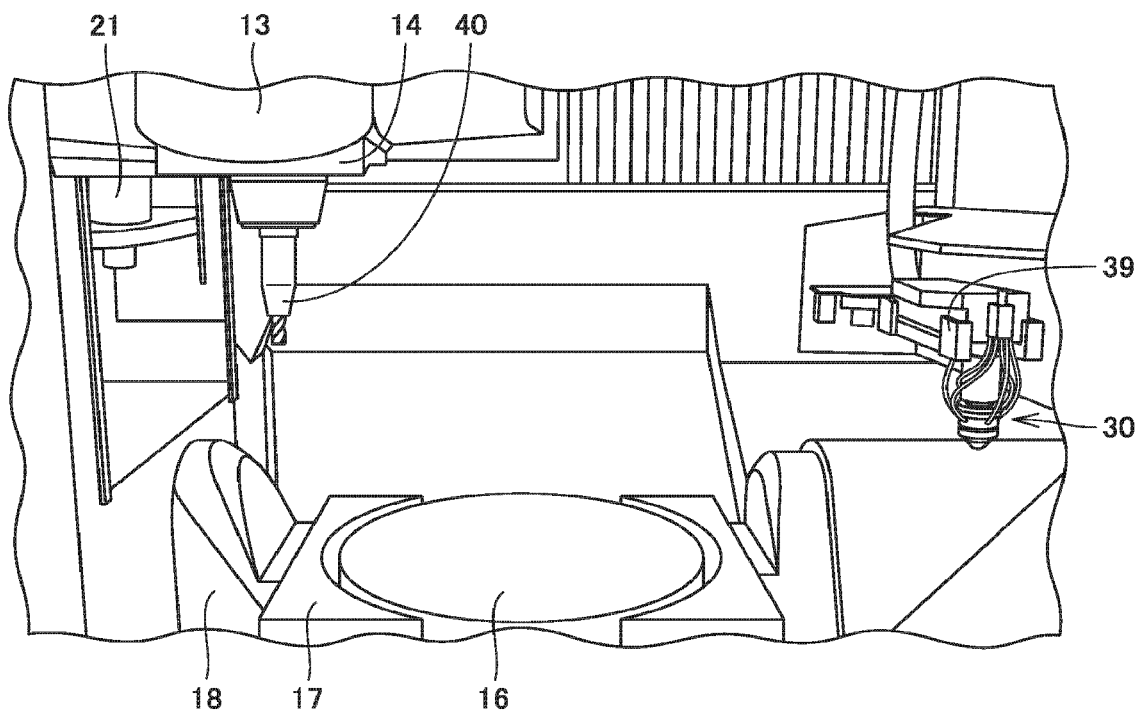
FIG. 3 shows a state in which a tool holder 40 is attached to spindle 14.

FIG. 2 shows a state in which additive manufacturing apparatus 30 is attached to spindle 14. With reference to FIG. 2, additive manufacturing apparatus 30 includes an application unit 310, an attachment unit 320, and a hose unit 330.

Although details will be described later, metal powders or the like are applied from tip 311 of application unit 310. Attachment unit 320 is a member for fixing additive manufacturing apparatus 30 to spindle 14. Hose unit 330 is a supply path of the powders or the like. Hose unit 330 is provided to supply the powders or the like from an apparatus (not shown) having the powders or the like stored therein to application unit 310 via attachment unit 320.

When additive manufacturing apparatus 30 is not used, machine tool 1 stores additive manufacturing apparatus 30 in a holder 39 for the additive manufacturing apparatus. It should be noted that holder 39 is configured to be rotatable while maintaining to be in parallel with the XY plane. That is, holder 39 is rotated with respect to an axis parallel to the Z axis.

FIG. 3 shows a state in which tool holder 40 is attached to spindle 14. With reference to FIG. 3, operating system 11 performs control to open door 19, and then causes the automatic tool changer to attach tool holder 40 to spindle 14. It should be noted that tool holder 40 is exchanged in a state in which additive manufacturing apparatus 30 is stored in holder 39.

Figure 4:
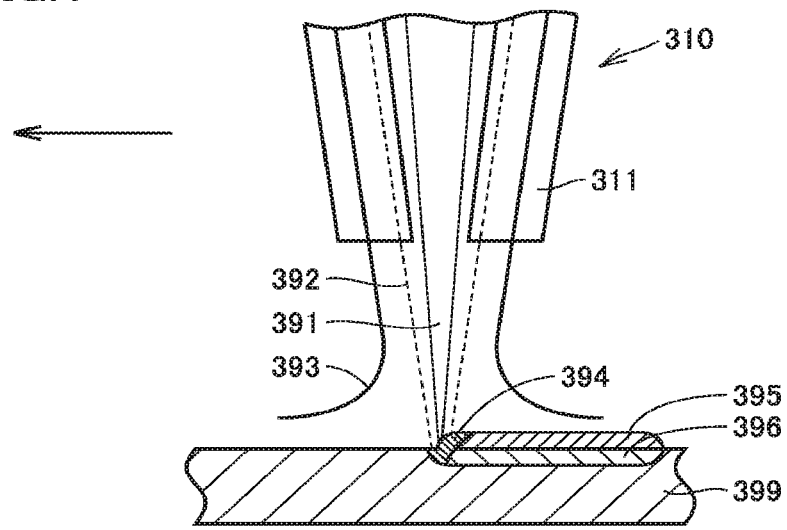
FIG. 4 illustrates a principle of additive manufacturing performed by additive manufacturing apparatus 30.

FIG. 4 illustrates a principle of additive manufacturing performed by additive manufacturing apparatus 30. With reference to FIG. 4, while moving in a predetermined direction (the direction of arrow), additive manufacturing apparatus 30 applies, from tip 311 of application unit 310, laser beam 391, metal powders 392, and gas 393 for shield and carrier. Accordingly, a melted point 394 is formed on the surface of workpiece 399, with the result that metal powders 392 are welded thereto.

Specifically, a cladding layer 396 is formed on workpiece 399. A cladding material 395 is provided on cladding layer 396. When cladding material 395 is cooled, a metal layer that can be machined is formed on workpiece 399. It should be noted that electron beam may be employed instead of laser beam 391.

<B. Exemplary Process>

Hereinafter, a specific example of a machining process performed by machine tool 1 will be described. Specifically, as one exemplary machining process performed by machine tool 1, the following describes a process for manufacturing the composite member by performing cutting and additive manufacturing. Particularly, a method for manufacturing a tubular body will be exemplified and illustrated below. It should be noted that the shape of the composite member to be manufactured is not limited to the tubular shape. Moreover, the material of the composite member to be manufactured is not limited to the below-described example.

(b1. Production of Base Member)

Figure 5:
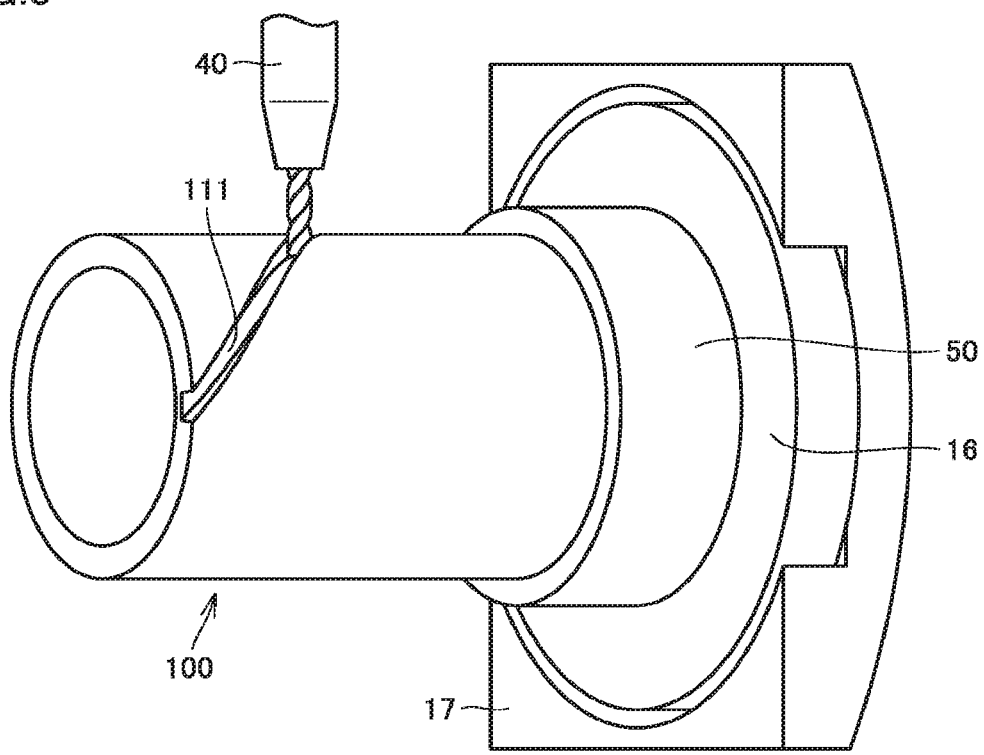
FIG. 5 illustrates a process for obtaining a base member by cutting a workpiece 100.

FIG. 5 illustrates a process for obtaining the base member by cutting workpiece 100. With reference to FIG. 5, machine tool 1 starts cutting using tool holder 40 in order to form a predetermined pattern of groove portion 111 in the surface of workpiece 100 having a cylindrical shape and fixed to a fixture 50. Workpiece 100 can be composed of a material such as steel, for example.

It should be noted that the formation of the groove involves rotation of rotation table 16 and movement (for example, movement in the Y-axis direction) of tool holder 40. Moreover, the rotation speed of rotation table 16, the movement speed of tool holder 40, the rotation speed of the end mill of tool holder 40, and the like are determined based on an instruction from operating system 11.

Figure 6:
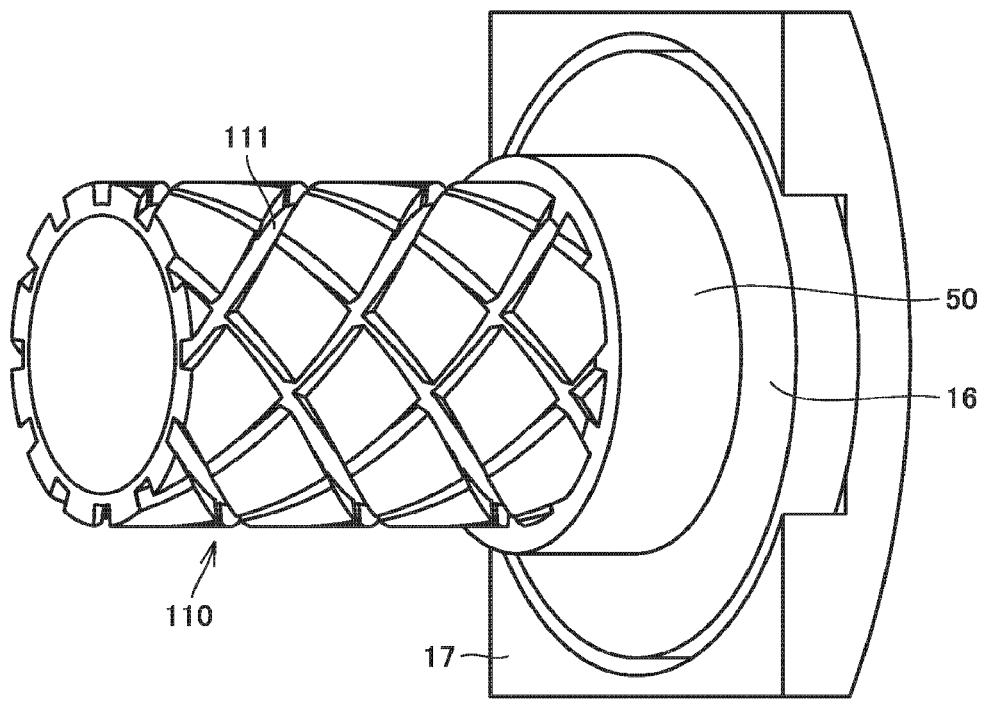
FIG. 6 shows an external appearance of base member 110 manufactured by cutting workpiece 100.

FIG. 6 shows an external appearance of base member 110 manufactured by cutting workpiece 100. With reference to FIG. 6, base member 110 has a predetermined pattern of groove portion 111 in its surface.

(b2. First Three-Dimensional Printing Process and Surface Machining Process)

Figure 7:
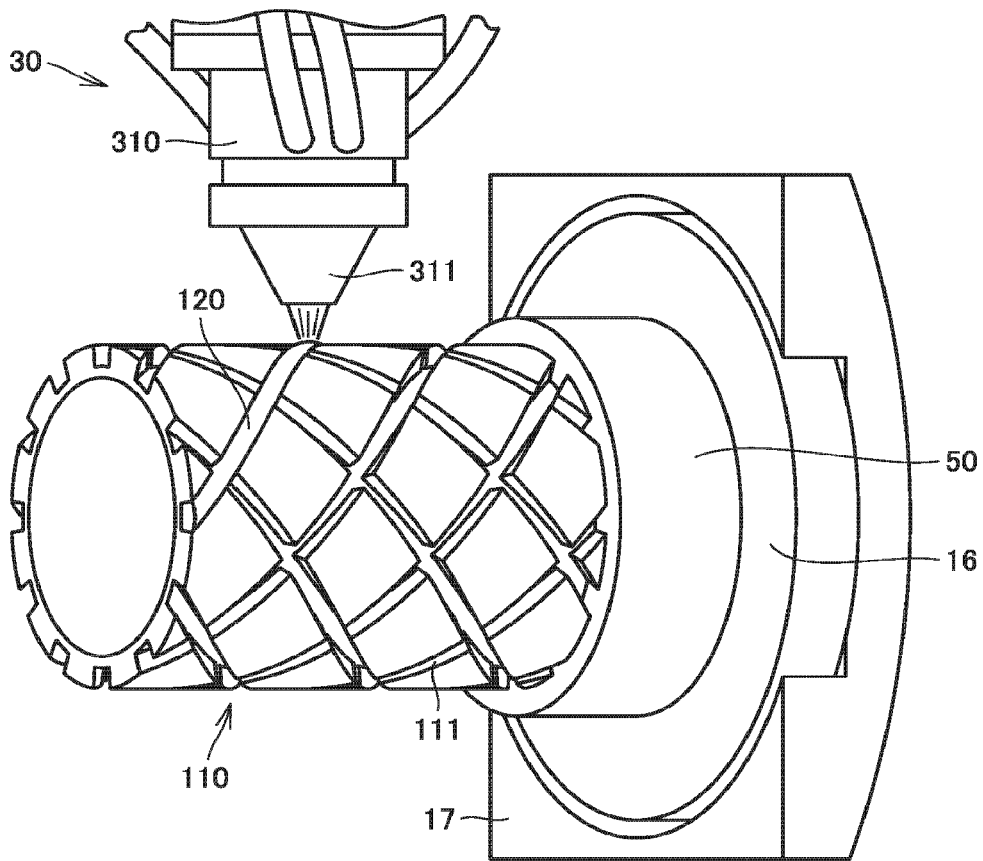
FIG. 7 shows a state in which additive manufacturing is performed to base member 110.

FIG. 7 shows a state in which additive manufacturing is performed to base member 110. With reference to FIG. 7, machine tool 1 employs additive manufacturing apparatus 30 to perform cladding (3D-printing), to groove portion 111, using a metal different from steel.

Specifically, machine tool 1 forms metal layer 120 on the surface of groove portion 111 by applying powders, such as a copper alloy, an aluminum alloy, or a nickel-based superalloy, from tip 311 of additive manufacturing apparatus 30. More specifically, by way of additive manufacturing, machine tool 1 forms metal layer 120 having a thickness to fill groove portion 111. In other words, machine tool 1 fills groove portion 111 with a metal different from the material of base member 110.

It should be noted that for an intersection of groove in groove portion 111, operating system 11 may restrict application of powders 392 from application unit 310 in order to prevent the cladding from being performed twice. The program of operating system 11 may be designed in advance to restrict the application at the position of the intersection by determining the position of the intersection (position thereof in the surface of base member 110) based on the program designed by the user.

Figure 8:
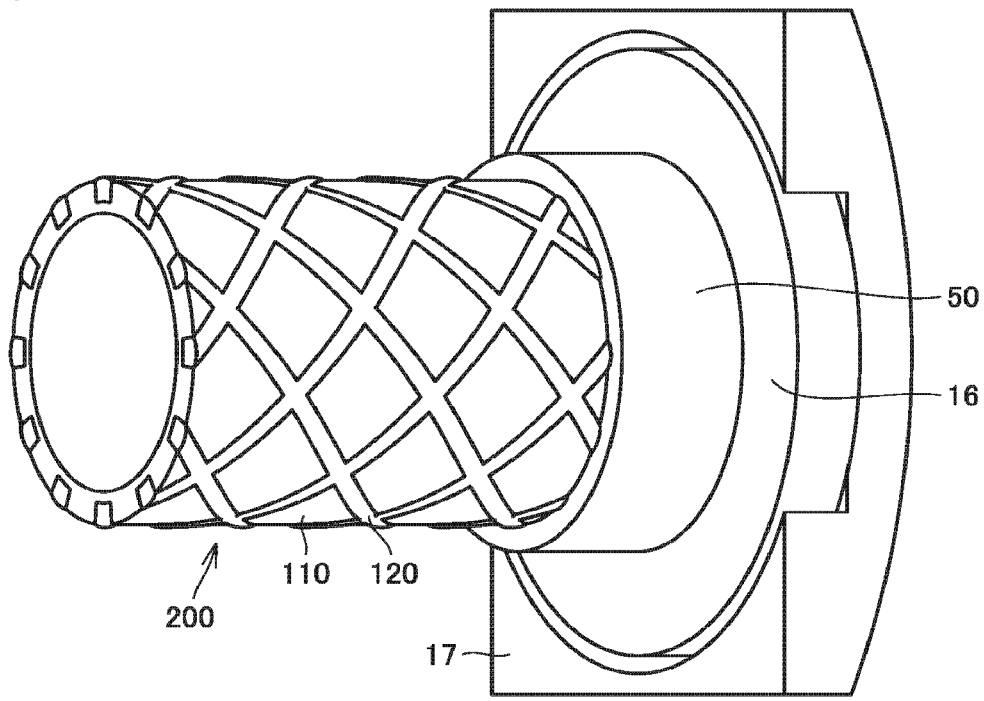
FIG. 8 shows an external appearance of an intermediate member 200 obtained by performing additive manufacturing to base member 110.

FIG. 8 shows an external appearance of an intermediate member 200 obtained by performing additive manufacturing to base member 110. With reference to FIG. 8, intermediate member 200 is a composite member having base member 110 and metal layer 120. Metal layer 120 has the same pattern as the pattern of groove portion 111 formed by cutting.

The following describes a step of removing a portion of metal layer 120 (second member) added (welded) by additive manufacturing and composed of the second material. After intermediate member 200 of FIG. 8 is obtained, machine tool 1 machines a surface of intermediate member 200. Specifically, machine tool 1 machines at least a surface of metal layer 120. It should be noted that machine tool 1 may also machine a surface of base member 110 as with metal layer 120.

Figure 9:
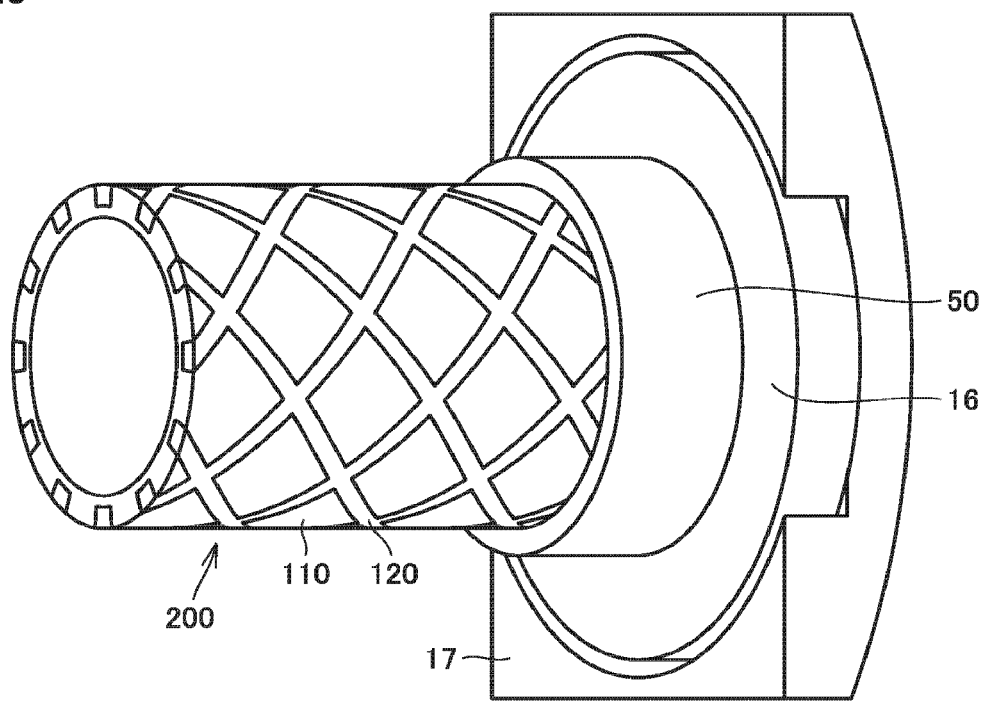
FIG. 9 shows an external appearance of intermediate member 200 after machining the surface of intermediate member 200.

FIG. 9 shows an external appearance of intermediate member 200 after machining the surface of intermediate member 200. With reference to FIG. 9, the surface machining process provides reduced irregularities in the surface of intermediate member 200 as compared with those in the state of FIG. 8.

Figure 10:
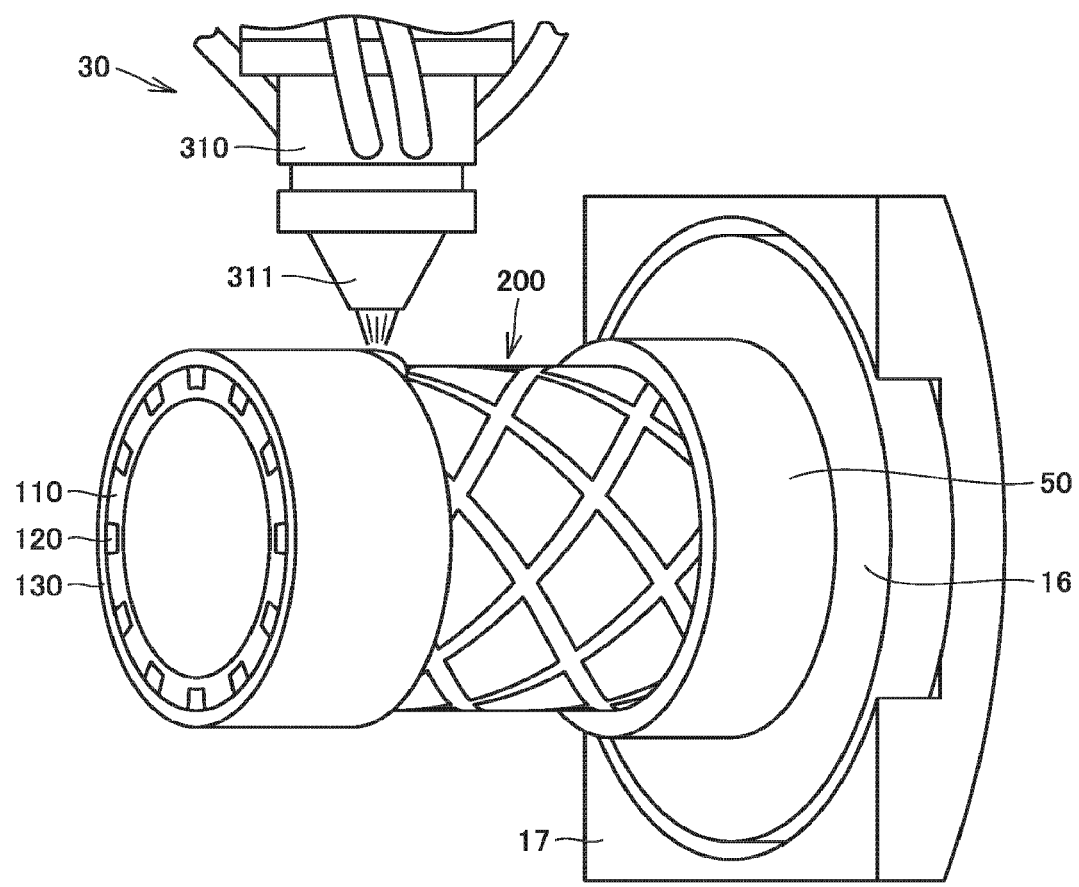
FIG. 10 shows a state in which additive manufacturing is performed to intermediate member 200.

It should be noted that as described below, the surface of intermediate member 200 may not be necessarily machined if additive manufacturing is further performed to the surface of intermediate member 200 (FIG. 10).

As described above, intermediate member 200 serving as the composite member is manufactured by the manufacturing method including the step of adding, on the surface of base member 110 (first member) composed of the first material (for example, steel), the second material (such as a copper alloy, an aluminum alloy, or a nickel-based superalloy) different from the first material, using additive manufacturing employing directed energy deposition as an additive manufacturing process. Moreover, the method for manufacturing such a tubular body is performed by placing base member 110 (first member) in the machining area of machine tool 1 configured to perform subtractive machining. The composite member is manufactured in the machining area within machine tool 1 and is therefore brought into a state in which it can be promptly machined.

Moreover, the method for manufacturing the tubular body further includes the step of manufacturing base member 110 by cutting workpiece 100 using machine tool 1. Accordingly, the manufacturing of base member 110 and the additive manufacturing can be performed in the same apparatus (specifically, machining area of machine tool 1).

Moreover, in the step of adding the second material to base member 110, the second material is added to the cut portion of workpiece 100. Accordingly, a portion of workpiece 100 can be replaced with the metal layer composed of the second material.

(b3. Second Three-Dimensional Printing Process)

FIG. 10 shows a state in which the additive manufacturing is performed to intermediate member 200. With reference to FIG. 10, machine tool 1 uses additive manufacturing apparatus 30 to perform cladding (3D-printing) using steel powders on the outer circumferential surface of intermediate member 200. That is, machine tool 1 forms metal layer 130 composed of steel on the outer circumferential surface of intermediate member 200. It should be noted that the formation of metal layer 130 involves rotation of rotation table 16 and movement of additive manufacturing apparatus 30 (for example, movement in the Y-axis direction).

Figure 11:
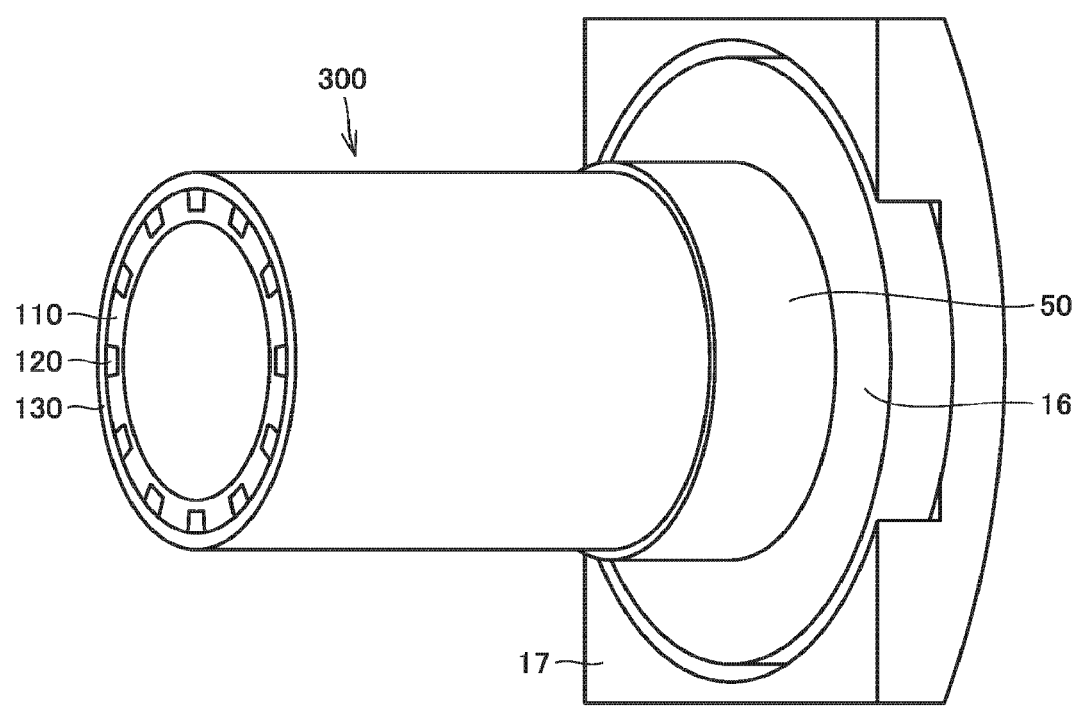
FIG. 11 shows an external appearance of a finished product 300 obtained by performing additive manufacturing to intermediate member 200 having been through the surface machining process.

FIG. 11 shows an external appearance of a finished product 300 obtained by performing additive manufacturing to intermediate member 200 (FIG. 9) having been through the surface machining process. Specifically, FIG. 11 shows the external appearance of finished product 300 obtained by performing a surface machining process to the outer circumferential surface after performing the additive manufacturing. With reference to FIG. 11, finished product 300, which serves as the composite member, is a composite member having base member 110, metal layer 120, and metal layer 130 serving as an outer layer.

As described above, the method for manufacturing the tubular body further includes the step of manufacturing metal layer 130 (third member) using the additive manufacturing to cover intermediate member 200 after the surface machining process (removing). According to the configuration, the plurality of metal layers 120, 130 composed of different materials can be formed on the surface of base member 110.

(b4. Advantages of Obtained Finished Product)

(1) The following describes an advantage when the material of each of base member 110 and metal layer 130 is steel and the material of metal layer 120 is a copper alloy.

The copper alloy is inferior to steel in terms of strength but has a higher thermal conductivity. Hence, due to existence of metal layer 120, finished product 300 can have an increased thermal conductivity as compared with that of a tubular body composed of only steel and having the same shape. Moreover, since only metal layer 120 is composed of the copper alloy, finished product 300 has a strength comparable to that of the tubular body composed of only steel and having the same shape.

Particularly, metal layer 120 exists between base member 110 and metal layer 130, so that metal layer 120 inferior to base member 110 and metal layer 130 in strength is not exposed to outside apart from both the ends of finished product 300. Hence, even if a certain external force is exerted on the surface of finished product 300, finished product 300 is less likely to be scratched as compared with a case where the metal layer composed of the copper alloy is exposed. Furthermore, since metal layer 120 composed of the copper alloy is not exposed, a heat retaining property is more excellent than that in the case where metal layer 120 composed of the copper alloy is exposed.

It should be noted that also when the material of metal layer 120 is composed of an aluminum alloy, the same advantage is attained as that in the case where the material of metal layer 120 is the copper alloy.

(2) Next, the following describes an advantage when the material of each of base member 110 and metal layer 130 is steel and the material of metal layer 120 is a nickel-based superalloy.

The nickel-based superalloy has a higher strength than that of steel. Accordingly, due to the existence of metal layer 120, finished product 300 can have a significantly increased strength as compared with that of the tubular body composed of only steel and having the same shape. Thus, in finished product 300, metal layer 120 can be functioned as a reinforcement member. Further, finished product 300 can have a higher vibration damping ratio (i.e., ability of a material to absorb and attenuate vibration energy) than that of the tubular body composed of only steel and having the same shape. It should be noted that figuratively speaking, a difference between the strength of finished product 300 and the strength of the tubular body composed of only steel and having the same shape can be similar to a difference between the strength of a carbon fiber reinforced plastic (CFRP) and the strength of a normal plastic.

Moreover, the nickel-based superalloy has a lower thermal conductivity than that of steel. Hence, when finished product 300 is required to have a low thermal conductivity, finished product 300 can be a product having a thermal conductivity lower than that of the tubular body composed of only steel and having the same shape.

Moreover, the nickel-based superalloy is more expensive than steel. Accordingly, finished product 300 can be manufactured less expensively than a tubular body composed of only the nickel-based superalloy and having the same shape.

<C. Hardware Configuration>

Figure 12:
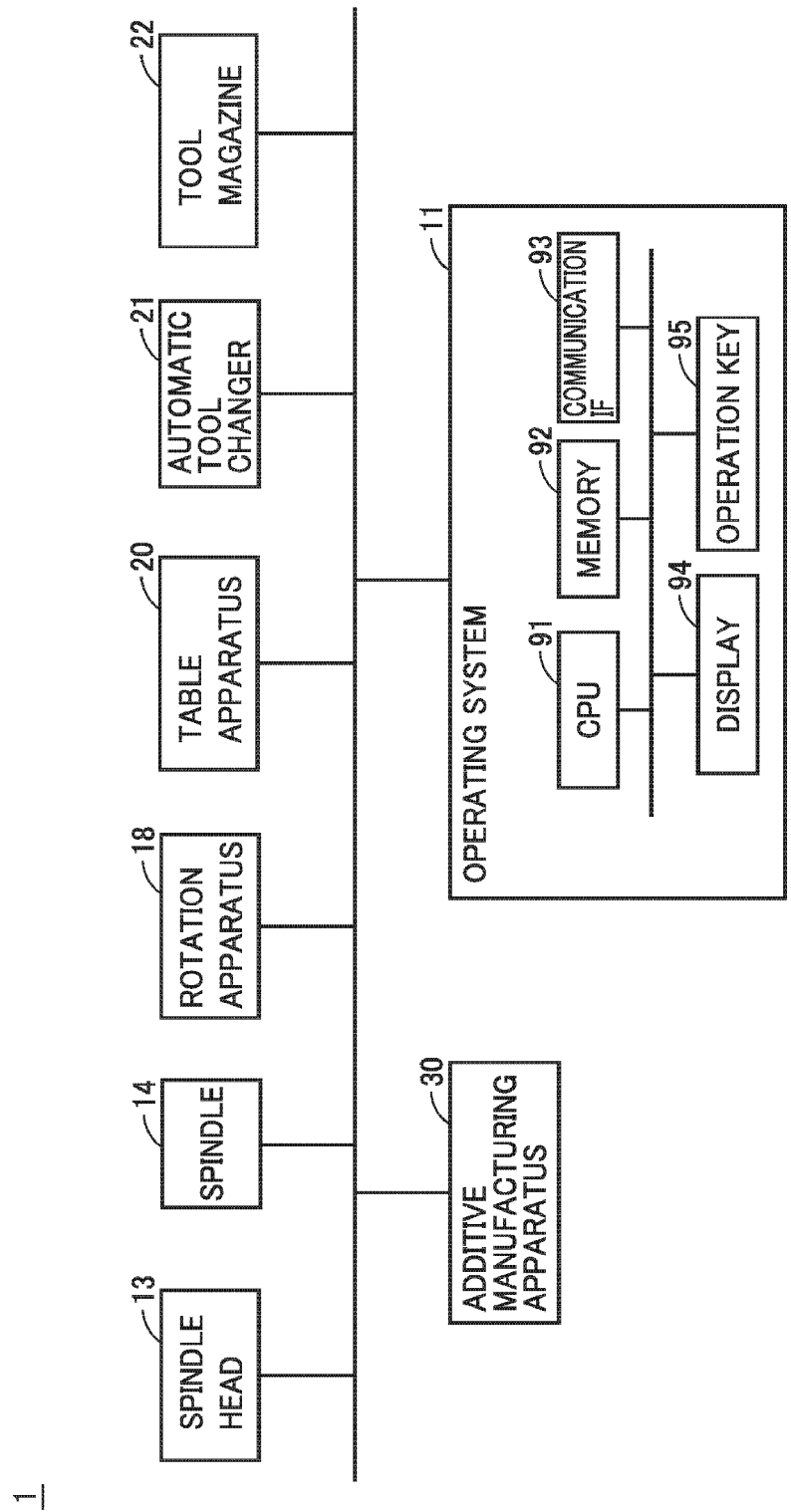
FIG. 12 shows an overview of a hardware configuration of machine tool 1.

FIG. 12 shows an overview of the hardware configuration of machine tool 1. With reference to FIG. 12, machine tool 1 includes operating system 11, spindle head 13, spindle 14, rotation apparatus 18, table apparatus 20, automatic tool changer 21, tool magazine 22, and additive manufacturing apparatus 30.

Operating system 11 has a CPU (Central Processing Unit) 91, a memory 92, a communication IF (InterFace) 93, a display 94, and an operation key 95.

CPU 91 executes various types of programs stored in memory 92, thereby controlling respective operations of units of machine tool 1 via communication IF 93. Display 94 displays various types of information in machine tool 1 such that the user of machine tool 1 can visually recognize the information. Operation key 95 receives various inputs (for example, inputs of starting machining) provided by the user.

Operating system 11 performs a process in accordance with an instruction from the user (process based on a program created by the user), thereby manufacturing finished product 300 of the composite member from workpiece 100 as described based on FIG. 5 to FIG. 11, for example.

<D. Control Structure>

Figure 13:
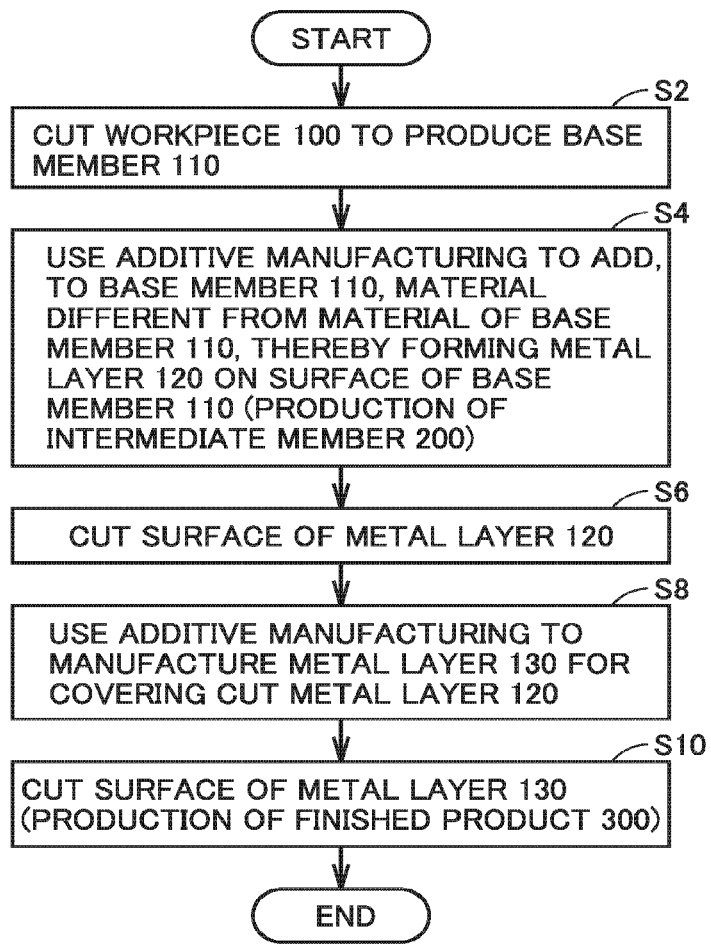
FIG. 13 is a flowchart showing a flow of a process for manufacturing finished product 300.

FIG. 13 is a flowchart showing a flow of the process for manufacturing finished product 300. With reference to FIG. 13, in a step S2, machine tool 1 cuts workpiece 100 to produce base member 110. In a step S4, machine tool 1 uses additive manufacturing to add, to base member 110, the material different from the material of base member 110, thereby forming metal layer 120 on the surface of base member 110. Accordingly, intermediate member 200 is produced.

In a step S6, machine tool 1 cuts the surface of metal layer 120 in intermediate member 200. That is, machine tool 1 performs a surface machining process for removing a portion of metal layer 120. It should be noted that machine tool 1 may not perform step S6 as described above.

In a step S8, machine tool 1 uses additive manufacturing to manufacture metal layer 130 for covering metal layer 120 thus cut. In a step S10, machine tool 1 cuts the surface of metal layer 130. That is, machine tool 1 performs a surface machining process for removing a portion of metal layer 130. Accordingly, finished product 300 is produced.

<E. Modifications>

(1) The description above is directed to the method for producing the base member by cutting workpiece 100 using the tool; however, it is not limited to this. For example, base member 110 may be manufactured using additive manufacturing. In other words, base member 110 may be manufactured by performing cladding to a workpiece (not shown).

(2) The description above is directed to the configuration (FIG. 4) in which application unit 310 has one application opening for powders 392; however, it is not limited to this. Additive manufacturing apparatus 30 may be configured to have two or more application openings from which powders of different metals can be applied respectively, for example.

(3) In the description above, metal layer 130 composed of steel is created by using additive manufacturing apparatus 30 to perform the cladding to the outer circumferential surface of intermediate member 200 using the powders of the same material (i.e., steel) as that of base member 110. However, it is not limited to this. Metal layer 130 serving as an outer layer may be formed using a metal different from steel and the material of the powders used for the formation of metal layer 120.

(4) The description above is directed to the example in which the surface machining process is performed to metal layers 120, 130 formed by additive manufacturing; however, it is not limited to this. Various machining processes (for example, a machining process to open a hole) may be performed to metal layers 120, 130 using various tools in machine tool 1.

(5) The method for manufacturing the composite member may be configured as follows. FIG. 14 illustrates a configuration in which the direction of applying the metal powders upon performing additive manufacturing is changed for each area to which the metal powders are applied.

As with FIG. 7, FIG. 14 (A) shows a state during cladding (3D printing) performed to groove portion 111 using a metal different from steel. FIG. 14 (B) shows a state during cladding performed, using the metal different from steel, to the surface (outer circumferential surface) of base member 110 at an area 112 different from groove portion 111.

With reference to FIGS. 14 (A) and (B), machine tool 1 sets angle of application of laser beam 391 and angle of application of metal powders 392 with respect to area 112 such that these angles differ from angle of application of laser beam 391 and angle of application of metal powders 392 with respect to groove portion 111.

That is, operating system 11 controls the posture of base member 110 such that in the groove portion (first area) in the surface of base member 110, each of the angle of application of laser beam 391 and angle of application of powders 392 with respect to groove portion 111 becomes a first angle. Moreover, operating system 11 controls the posture of base member 110 such that in area 112 (second area) in the surface of base member 110, each of the respective angles of application of laser beam 391 and powders 392 with respect to area 112 becomes a second angle different from the first angle.

Thus, according to machine tool 1, the direction of cladding (direction of building up) on the underlying metal can be changed for each area set by the user in advance. Hence, as compared with a configuration in which the direction of cladding cannot be changed for each area, machine tool 1 can manufacture a composite member having a complicated shape.

The embodiments disclosed herein are illustrative and are not limited to only the content above. The scope of the present invention is defined by the terms of the claims, and is intended to include any modifications within the scope and meaning equivalent to the terms of the claims.

REFERENCE SIGNS LIST

1: machine tool; 11: operating system; 12: splash guard; 13: spindle head; 14: spindle; 16: rotation table; 17: mount; 18: rotation apparatus; 19: door; 20: table apparatus; 21: automatic tool changer; 22: tool magazine; 30: additive manufacturing apparatus; 39: holder; 40: tool holder; 50: fixture; 91: CPU; 92: memory; 100, 399: workpiece; 110: base member; 111: groove portion; 112: area; 120, 130: metal layer; 200: intermediate member; 300: finished product; 310: application unit; 311: tip; 320: attachment unit; 330: hose unit; 391: laser beam; 392: powder; 393: gas; 395: cladding material; 396: cladding layer.

The invention claimed is:

1. A method for manufacturing a composite member, the method comprising:
mounting a first member composed of a first metal material on a fixture of a machine tool in a machining area of the machine tool;
performing subtractive machining on an outer peripheral surface of the first member by the machine tool while the first member is mounted to the fixture;
adding a second metal material on a surface of the first member in the machining area, using additive manufacturing employing directed energy deposition as an additive manufacturing process;

removing a portion of a second member composed of the added second metal material in the machining area; and manufacturing a third member in the machining area using the additive manufacturing to cover each of the second member and the first member after the removing of the portion of the second member, wherein a metal that forms the first metal material is a different type of metal than a metal that forms the second metal material, wherein the third member is composed of the metal that forms the first metal material or is composed of a metal that forms the third metal material different from the metal of the first metal material and the metal of the second metal material, wherein the subtractive machining on the first member includes using the machine tool to form a plurality of intersecting grooves on the outer peripheral surface of the first member, wherein the first member is tubular, and wherein the plurality of intersecting grooves are formed around the entire circumference of the outer peripheral surface of the first member.

2. The method for manufacturing the composite member according to claim 1, further comprising manufacturing the first member by cutting a workpiece using the machine tool.

3. The method for manufacturing the composite member according to claim 2, wherein in adding the second metal material, the second metal material is added to the plurality of intersecting grooves.

4. The method for manufacturing the composite member according to claim 1, further comprising manufacturing the first member by the additive manufacturing.

5. The method for manufacturing the composite member according to claim 1, wherein the directed energy deposition employs a laser or electron beam, and the machine tool is capable of changing a posture of the first member placed in the machining area, the method for manufacturing the composite member comprising:

controlling the posture of the first member such that an angle of application of the laser or the electron beam with respect to a first area of the first member becomes a first angle in the first area; and controlling the posture of the first member such that an angle of application of the laser or the electron beam with respect to a second area of the first member becomes a second angle in the second area.

6. The method for manufacturing the composite member according to claim 1, wherein the second metal material has a thermal conductivity higher than a thermal conductivity of the first metal material.

7. The method for manufacturing the composite member according to claim 1, wherein the second metal material has a first strength, wherein the first metal material has a second strength, and wherein the first strength is greater than the second strength.

8. The method for manufacturing the composite member according to claim 1, wherein the first metal material is steel, and wherein the second metal material is one of a copper alloy, aluminum alloy, and a nickel-based superalloy.

* * * * *